United States Patent [19]

Wilds et al.

[11] 4,278,417
[45] Jul. 14, 1981

[54] INTERNALLY LOCKED CORE CENTERING MOLD ASSEMBLY

[75] Inventors: Robert W. Wilds; Robert E. Meyer, both of Indianapolis; Walter A. Grannen, III, Bargersville; Dannie Bryant, Greenwood, all of Ind.

[73] Assignee: E. W. Mold & Tool Co. Inc., Indianapolis, Ind.

[21] Appl. No.: 108,517

[22] Filed: Dec. 31, 1979

[51] Int. Cl.³ .................... B29C 1/06; B29F 1/022
[52] U.S. Cl. .................... 425/577; 425/468; 425/DIG. 5
[58] Field of Search ............. 425/468, DIG. 5, 577, 425/588

[56] References Cited

U.S. PATENT DOCUMENTS

| | | | |
|---|---|---|---|
| 2,301,338 | 11/1942 | Smith | 425/468 X |
| 2,542,263 | 2/1951 | Schultz | 425/DIG. 5 |
| 2,822,578 | 2/1958 | Lobell | 425/DIG. 5 |
| 3,060,509 | 10/1962 | McCubbins | 425/DIG. 5 |
| 3,473,197 | 10/1969 | Wilds et al. | 425/468 X |
| 3,564,468 | 2/1971 | Darnell | 425/468 X |
| 3,767,156 | 10/1973 | Sullivan et al. | 425/468 X |

FOREIGN PATENT DOCUMENTS

| | | | |
|---|---|---|---|
| 114417 | 12/1900 | Fed. Rep. of Germany | 425/468 |
| 599570 | 3/1948 | United Kingdom | 425/468 |
| 1090810 | 11/1967 | United Kingdom | |
| 504661 | 4/1976 | U.S.S.R. | 425/468 |

*Primary Examiner*—J. Howard Flint, Jr.
*Attorney, Agent, or Firm*—Woodard, Weikart, Emhardt & Naughton

[57] ABSTRACT

A mold assembly is described for molding smooth-bottomed battery cases in which the necessary compression locking of the free ends of the elongated cantilever mounted cores is achieved by providing transverse locking pins which are carried within, and actuated to extend from, the interior of the cores themselves. Since no locking pins extend from the cavity, the interior surface of the base wall of the battery case is formed relatively smooth and flat.

8 Claims, 16 Drawing Figures

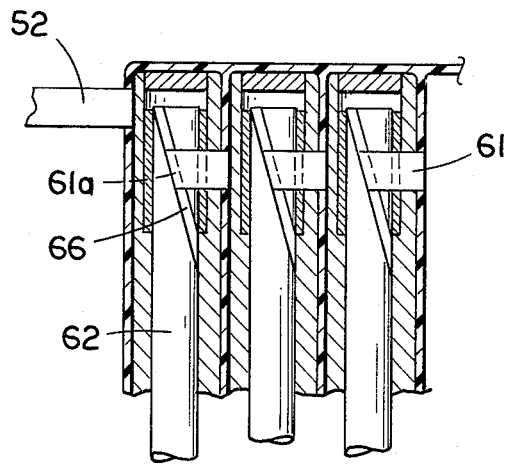
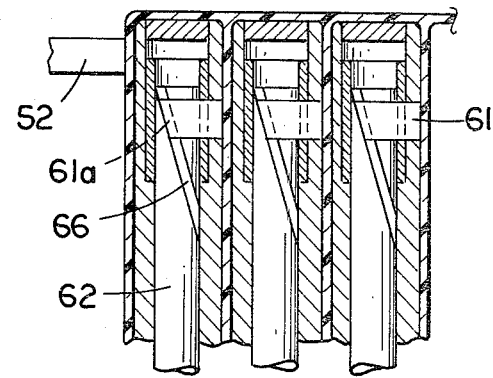
FIG. 7
FIG. 8
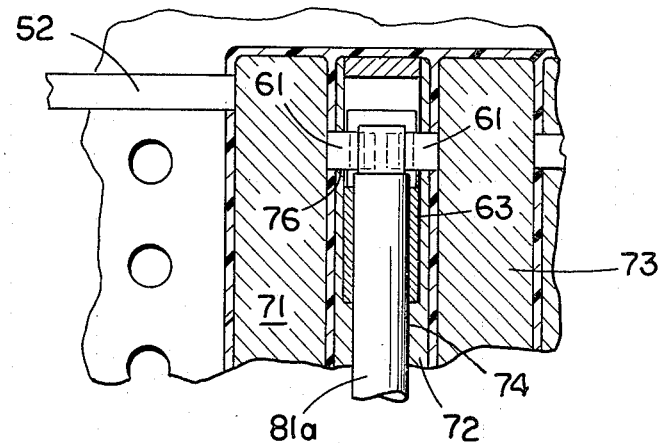
FIG. 9
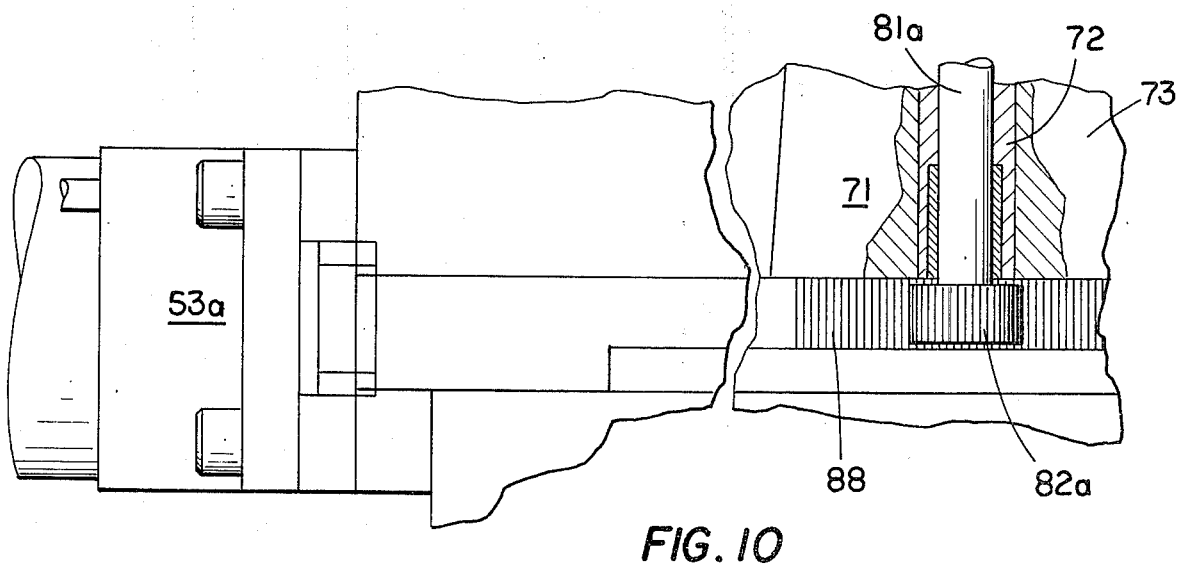
FIG. 10

INTERNALLY LOCKED CORE CENTERING MOLD ASSEMBLY

BACKGROUND OF THE INVENTION

In the injection molding of polyolefin battery cases, the interior partitions in the case are formed by elongated, cantilever mounted cores extending into the mold cavity. Because of the irregular flow of the hot melt and high injection pressure in the injection process, undesirable shifting of the cantilever mounted cores can occur causing irregular, non-uniform thickness of the partition walls. A recognized means for locking the cores against this undesirable shifting by placing the cores in transverse compression is disclosed and claimed in Wilds et al U.S. Pat. No. 3,473,197. The solution to the problem described in the patent has been satisfactory, but inherently produces a series of wedge-shaped protrusions on the inner face of the battery case base wall. The protrusions were acceptable because, until recently, polyolefin battery cases were designed with a series of spacer abutments or "mud ribs" extending from the inner surface of the base wall of the case. These functioned to space the packets of battery plates, inserted in the case, from the base allowing room for unwanted particles such as lead "burns" dropping from the plates to settle without shorting the plates. Since the wedge-shaped protrusions, caused by the locking pins, were below the profile of the spacer ribs or abutments, they created no difficulty. More recently, because of improved forms of packaging for the packets of battery plates, the use of spacer ribs has become unnecessary and designers of battery cases have required "smooth-bottomed" configurations so that the space formerly defined by the ribs can be utilized by battery plates of increased size. The inwardly projecting protrusions inherent in the core-locking means of U.S. Pat. No. 3,473,197 have thus become unsuitable in smooth-bottomed battery cases. While the structure disclosed in Sullivan et al, U.S. Pat. No. 3,767,156 produces a battery case having fewer protrusions in the base of the battery case, the cores are not held or locked by members engaging the cores and applying transverse, compressive stress on the cores, a necessary feature if the cores are to be effectively locked in place.

The concept of the present invention envisages a core-locking strategy in which the cores are locked in lateral compression by means, taking the form of locking pins, located within the cores themselves and movable transversely to the longitudinal axis of the cores to lock the adjoining cores in transverse compression thereby holding the cores against displacement during a portion of the injection process. No locking pins extending from the cavity are necessary, and flat or smooth bottomed cases can thus be molded. Since the locking pins are supported within, and extend from, the side surfaces of the cores themselves, the core position-locking engagement of transversely extending pins with the side walls of the adjacent cores in a parallel array of cores can be accomplished. While locking of a single core by pins engaging the core's sidewall is known in the prior art as disclosed in British Pat. Nos. 1,090,810 (1967) and 599,570 (1948), since these pins are disposed and actuated from positions exterior to the core, the arrangement cannot be utilized to extend between, or place in transverse compression, each core in an array of closely spaced, parallel cores. While alternate forms of driving mechanism for the locking pins are disclosed herein, it will be understood that within-the-cores placement of the pins and locking drives represents the primary distinguishing feature of the present invention.

BRIEF DESCRIPTION OF THE DRAWINGS

FIG. 7 is a fragmentary side sectional view of a portion of the core array with the locking members in extended position, corresponding to their positions of FIG. 2.

FIG. 8 is a view similar to FIG. 7 but showing the core locking members in retracted position.

FIG. 9 is a fragmentary, side sectional view of a modified form of the invention utilizing dual locking members.

FIG. 10 is a fragmentary, side sectional view of the actuating means for the dual locking member form of FIG. 9.

DESCRIPTION OF THE PREFERRED EMBODIMENTS

Figure 1:
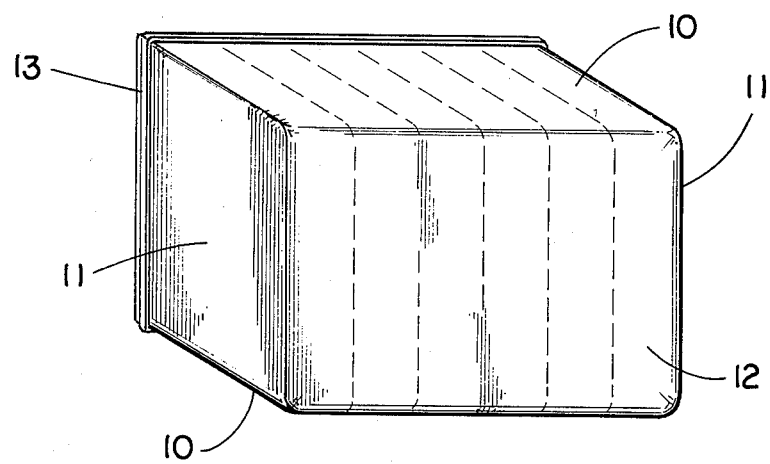
FIG. 1 is a perspective view of a battery case molded on the apparatus of the present invention.

Referring initially to FIG. 1, there is disclosed a battery case, injection molded of a suitable polyolefin material such as polypropylene. The battery case is rectangular having side walls 10, and walls 11 and a base wall 12. An integral ridge 13 borders the open upper end of the case. Five interior, integral partitions divide the case into six compartments which, in battery assembly, each receive packets of battery plates (not shown). Reference numerals set out above, identifying portions of the case, will be used in subsequent FIGS. of the drawing to identify the battery case molded in the apparatus of the present invention.

The mold assembly herein described is of the injection molding type in which two halves of the mold assembly are fastened in place to the stationary and movable die plates or press platens of a conventional injection molding machine (not shown).

Figure 3:
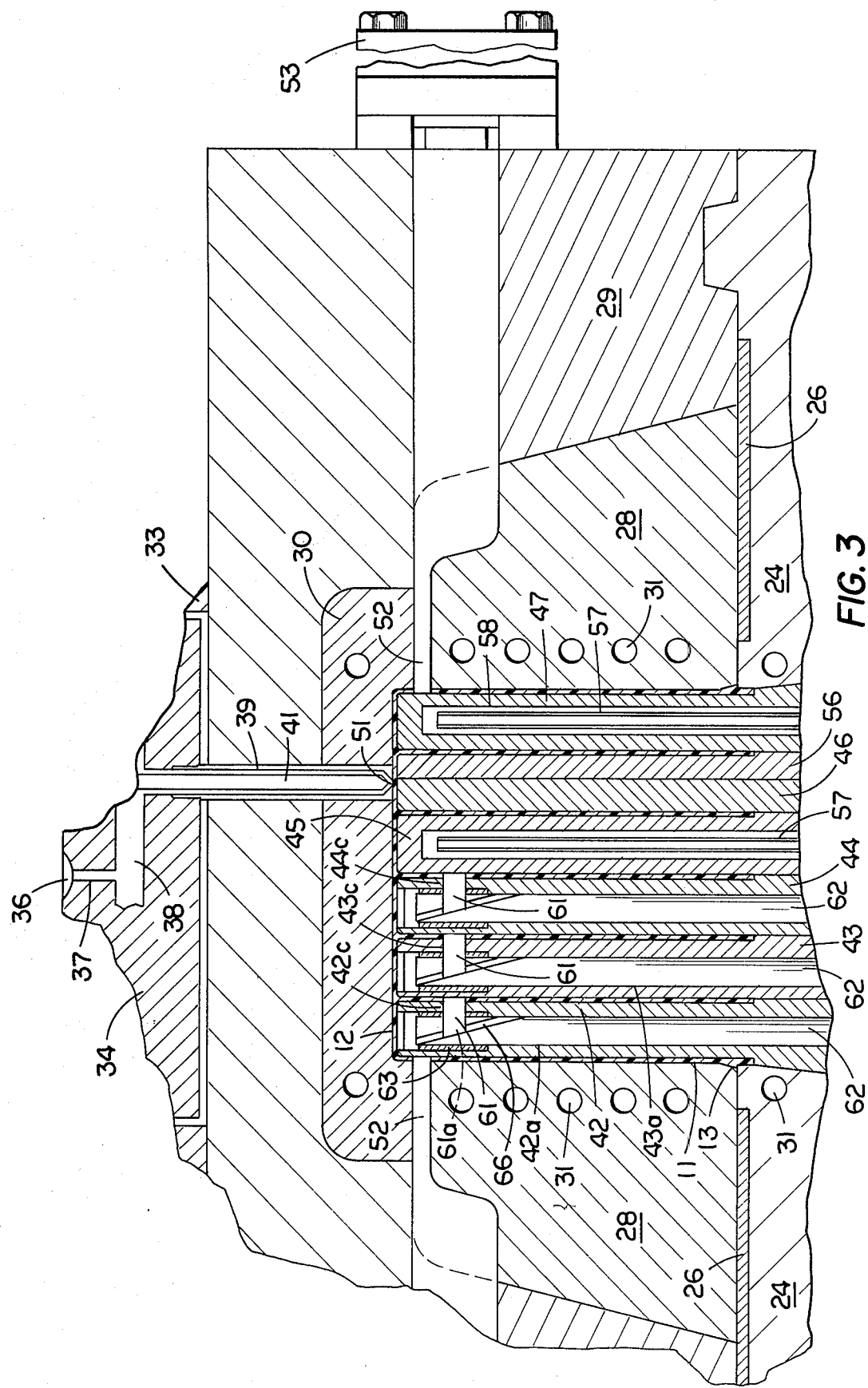
FIG. 3 is a fragmentary side sectional view of the mold assembly taken along the section line 3—3 of FIG. 2.
Figure 4:
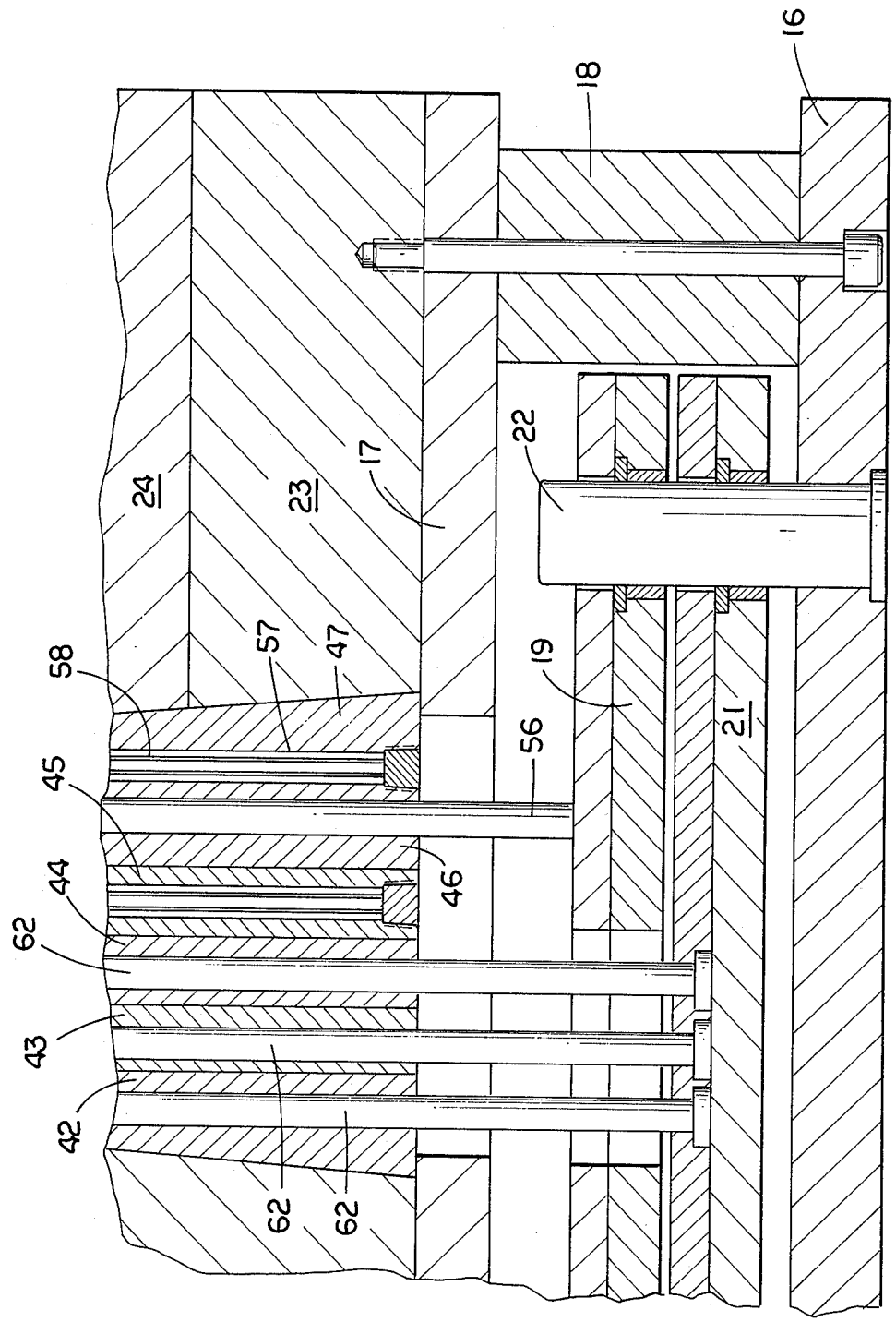
FIG. 4 is a fragmentary side sectional view showing the lower portion of the components shown in FIG. 3.

Referring initially to FIG. 4, the chase portion of the mold includes the bottom clamp plate 16 which underlies a core back-up plate 17 spaced by the support rail 18. A lifter knock-out plate 19 and an internal lock under-motion plate 21 are interposed between plates 16 and 17, their freedom for vertical motion being defined by the guide pins 22. The plate 21 can be moved vertically through a short range by any suitable means (not shown) during the molding cycle for a purpose to be subsequently described. Overlying plate 17 is a core yoke 23 and a stripper plate 24 (the lower portion only of plate 24 being visible in FIG. 4, the upper portion appearing in FIG. 3). The stripper plate carries cam wear plates 26 (FIG. 3) and the cam portion 28 of the assembly overlies the wear plates. Passages for the conventional circulation of cooling water, through the cam 28 and the stripper plate 24, are indicated at 31. Cavity yoke 29 abuts the cam 28. A cavity back-up block 32 overlies the cam 28 and a top clamp plate 33 above block 32 accommodates a hot runner bar 34. Block 32 accommodates the cavity insert 30. A locating ring, not shown, is mounted in the top clamp plate 33. The runner bar 34 is provided with an indentation 36 into which the press nozzle (not shown) seats. A passage 37 serves to transmit hot molding material from the injection nozzle into a runner passage 38 which acts as a header for a series of secondary drops or sprues, one of which is shown in FIG. 3 and identified at 39. The runner bar 34 may be provided, as conventional, with a heater (not shown) extending through the bar. Each of the secondary sprues 39 is provided with a heating element 41 which extends to the tapered discharge end 51 of the sprue. While only one of the secondary sprues is visible in FIG. 3, it will be understood that a duplicate secondary sprue 39 extends to a position adjacent to and centered on the free ends of each of the six cantilever mounted cores to be subsequently described, the configuration of the section line 3—3 of FIG. 2 accounting for the showing of only one sprue 39 in FIG. 3.

Cores 42, 43, 44, 45, 46 and 47 are secured at their base by the core yoke 23 (FIG. 4) and, when the mold is assembled, extend in parallel array into the cavity portion of the mold. The core array, in place, is separated from the cavity side cams 28 and the cavity insert 30 by an amount equal to the desired thickness of the exterior walls of the battery case of FIG. 1, and the cores are spaced from each other an amount equal to the desired thickness of the internal partitions forming the compartments.

As may be seen in FIG. 3 each of the outermost cores 42 and 47 in the array are held against lateral deflection by the side locking members 52 which are rigidly secured at their outer ends to the thrust pin of actuating means which take the form of hydraulic cylinders 53 (only the cylinder on the right hand side of the assembly being shown in FIG. 3). Actuation of the cylinders 53 moves the members 52 horizontally, as viewed in FIG. 3, from an extended position in which the side locking members are in engagement with the outer side surfaces of the outer cores, as in FIG. 3, to a retracted position (FIG. 8) spaced from the cores and vertically aligned with the cams 28. Such side locking members are disclosed in U.S. Pat. No. 3,473,197, mentioned above.

Figure 2:
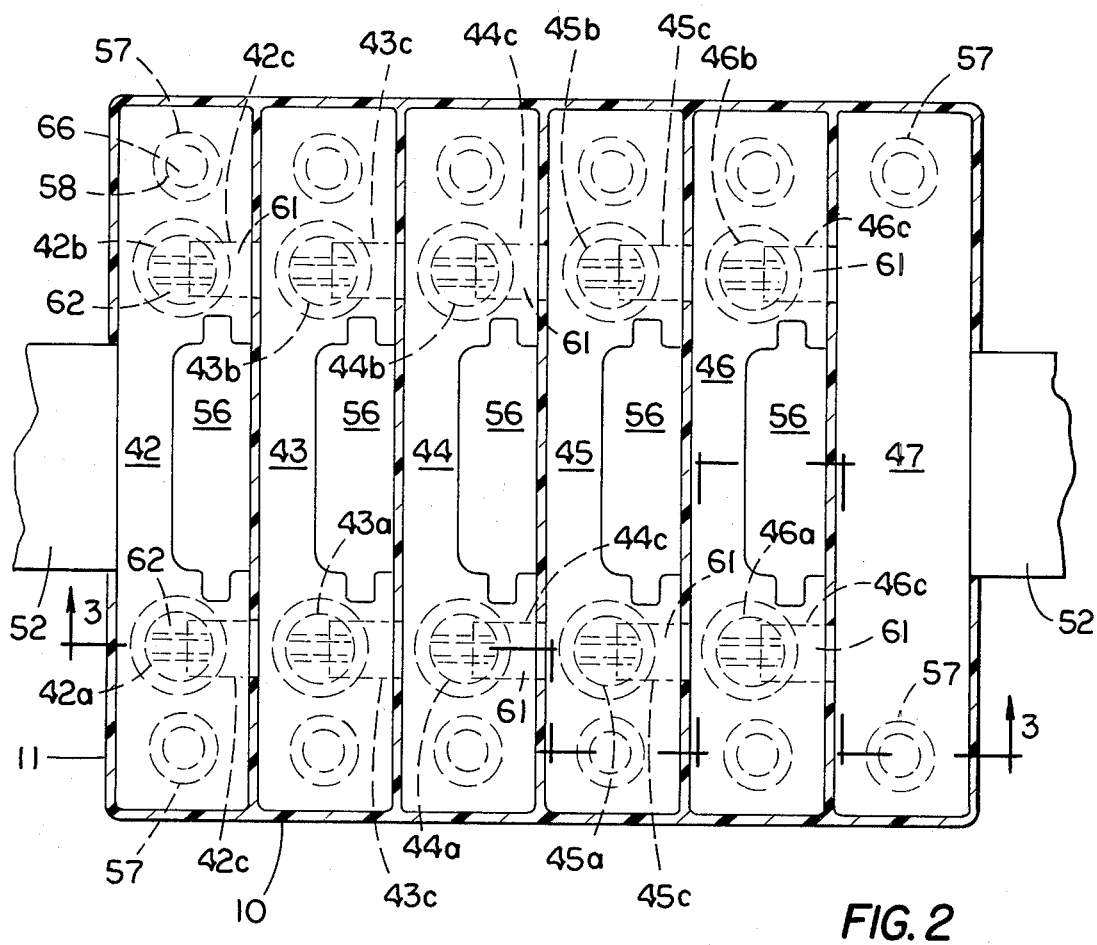
FIG. 2 is a top view of the mold assembly of the present invention with the bottom wall of a case in the mold removed for clarity.
Figure 5:
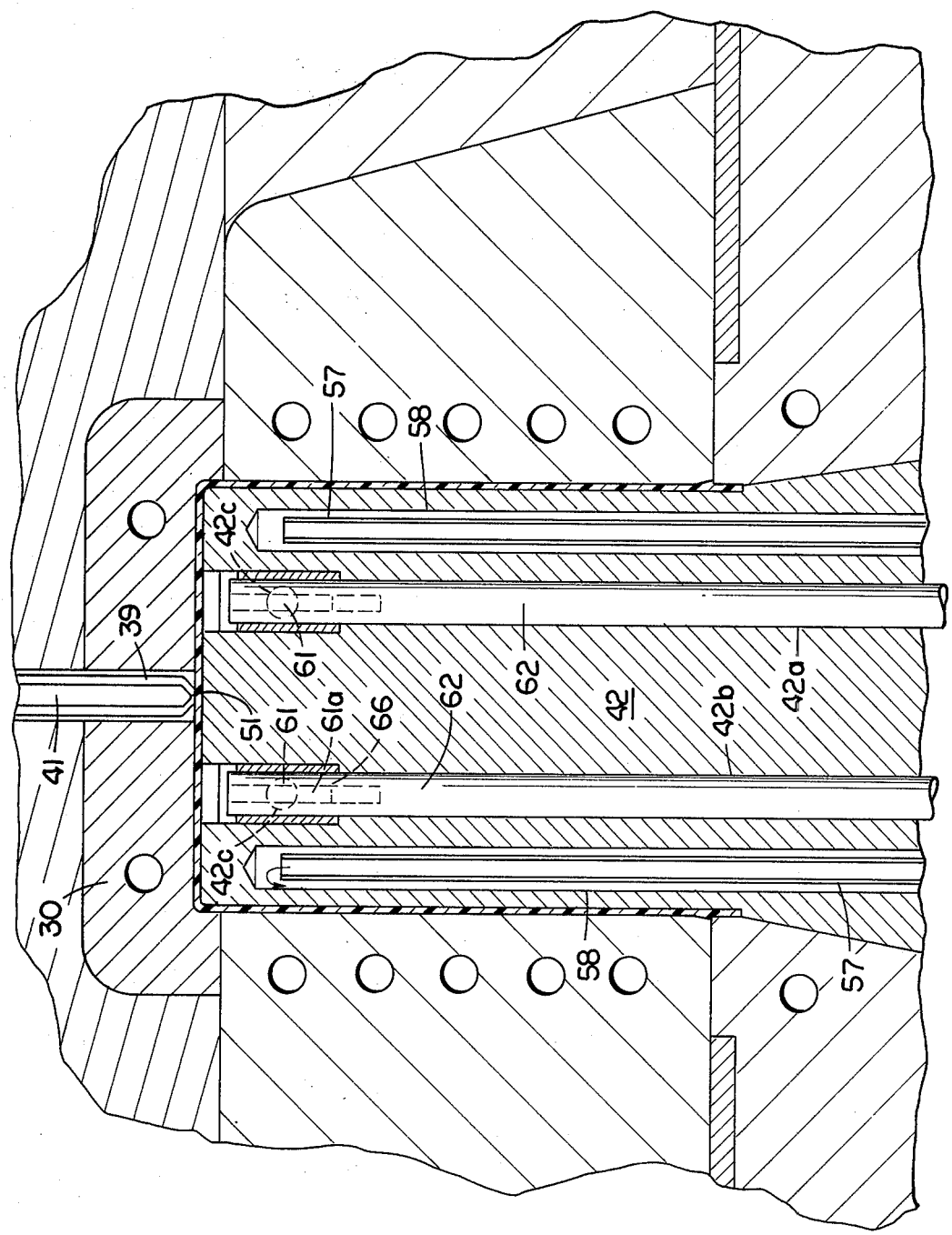
FIG. 5 is a fragmentary, sectional end view of the core array of FIG. 3 and taken at ninety degrees to FIG. 3.
Figure 6:
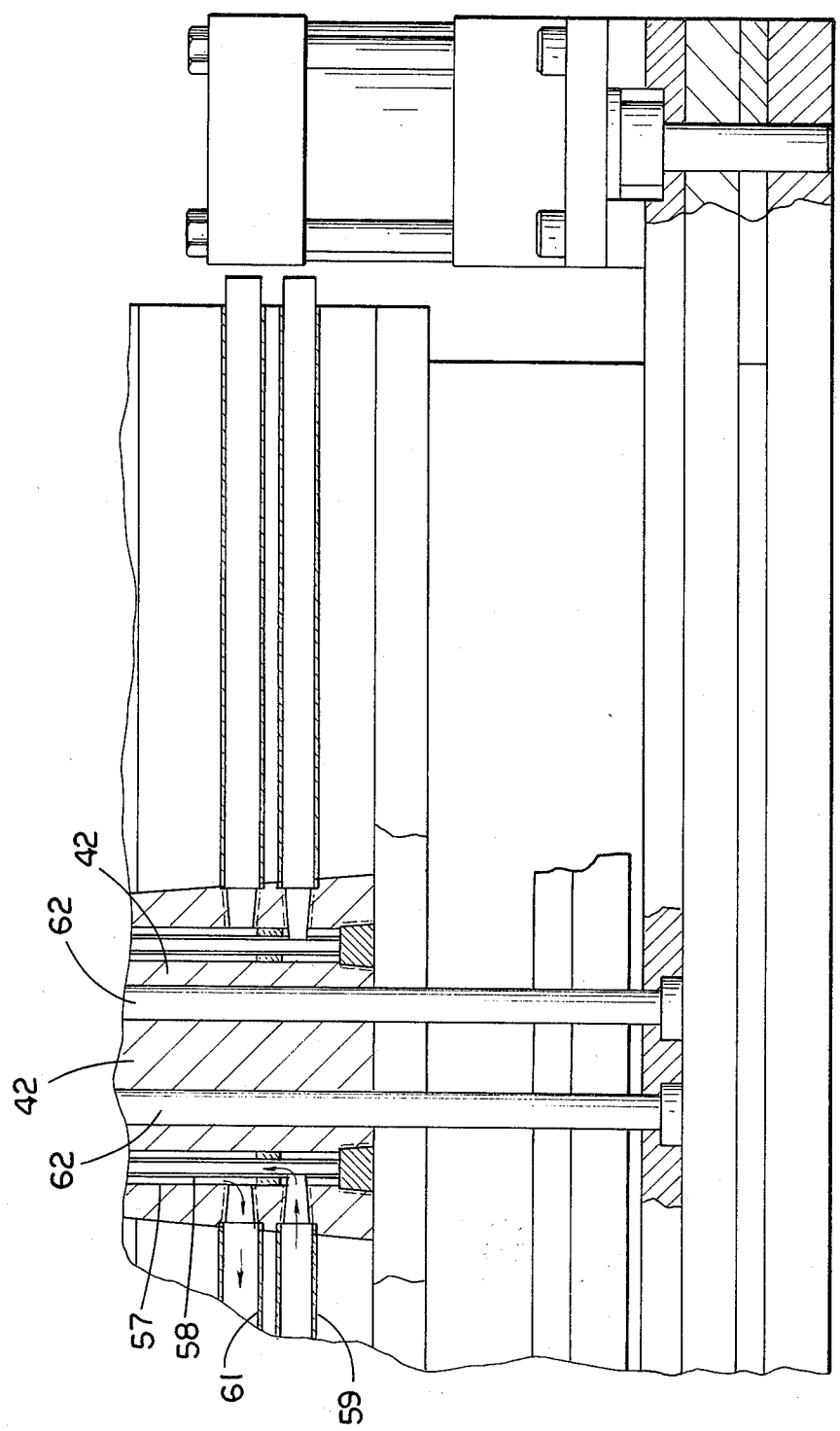
FIG. 6 is a fragmentary, sectional end view showing the lower portion of the components shown in FIG. 5.

As will be evident from FIGS. 2, 3 and 4, each of the cores, except outer core 47 is provided with a conventional lifter 56 which extends from, and is raised by, the lifter knock-out plate 19 (FIG. 4) when the case is to be removed from the mold as is conventional. Additionally, each of the cores, including core 47, are provided with spaced pairs of cooling passages 57 which receive a central tube 58 over which cooling water cascades, the input passage 59 and outlet passage 61 for the water circulation being shown in FIG. 6 for the core 42, the others duplicating this arrangement. The water circulating path is indicated by arrows in FIG. 5. It will be understood that this cascade water circulation method for cooling the cores is conventional.

Referring now primarily to FIGS. 2-6, the internal locking structure of the cores, the primary feature of the present invention, will now be described. As will be evident from FIGS. 2-4, each of the cores, except outer core 47, is provided with a longitudinal bore identified respectively at 42a, 43a, 44a, 45a and 46a (bores 42a, 43a and 44a being visible in FIG. 3 and bores 45a and 46a being visible in FIG. 2). A second set of duplicate longitudinal bores 42b, 43b, 44b, 45b and 46b (visible only in FIG. 2) are also formed in all of the cores except core 47.

Each of the longitudinal bores intersects a transverse bore in the cores located adjacent the free ends of the cores. The transverse bores are identified with the same reference numeral as their respective core but with the suffix "c." All the transverse bores are shown in FIG. 2, however, only bores 42c, 43c and 44c are visible in FIG. 3. Internal core locking members 61 occupy, and are slidable axially within, each of the transverse bores. The members 61 are movable within the bores between an extended position, in which they engage, and exert transverse compressive stress on, the side face of the next adjacent core (the extended position being shown in FIGS. 2, 3 and 7), and a retracted position (shown in FIG. 8) in which the ends of members 61 are substantially flush with the side faces of their respective cores.

An actuating means for the locking members 61 takes the form of driver pins 62 which are slidable within the bores and are supported by driver guide bushings 63 (FIG. 3). The pins 62 are simultaneously moved vertically through a limited stroke during the molding cycle by any conventional means such as the movable under-motion plate 21 (FIG. 4) adjacent the knock-out plate 19. The upper ends of the pins are provided with inclined slots 66 which receive inturned portions forming a head 61a on the inner end of locking members 61. The slot and head connection of the pins 62 and members 61 is such that the permitted vertical movement of the pins 62 is sufficient to cause the members 61 to travel between their retracted and extended positions, the vertical movement of the pins 62 being transformed, by the slot and head connection, into horizontal movement of the members 61.

In operation, when the molding operation starts, the locking members 61 and the side locking members 52 are in their extended positions (FIGS. 2 and 3). Typically, a polyolefin molding material, such as polypropylene is injected by the molding machine through the secondary sprues 39 into the space between the cores and the cavity. The hot liquid molding material flows into the spaces between the cores and around the outer core surfaces to assume the shape of the battery case of FIG. 1. The rate of flow and pressure of the liquid molding material into various parts of the core-cavity interspace causes an irregular, "stuttering" flow and this produces unbalanced, deflecting, hydrostatic forces on the cores which, it has been found, can be overcome only by placing each of the cores in transverse, or lateral compression. Engagement of the core ends by side members 52 and by locking members 61 tightly locks the cores in compression preventing deflection by uneven flow of the hot molding material. Since the locking members 61 are housed and operated from the interior of the cores themselves, the transverse compression locking can be accomplished without resulting in multiple protrusions from the inner surface of the base 12 of the molded case, a condition inherent in prior art schemes for producing the desired transverse compression locking of the cores.

After the core-cavity interspace has been filled, as the molding cycle proceeds, the side locking members 52 and the locking members 61 are moved by members 53 and 62, respectively, into their retracted positions of FIG. 8 in which they are spaced from the core surfaces by an amount corresponding to the desired local wall thickness for the molded containers. As the members 52 and 61 are withdrawn, molding material flows around them and closes the space at the core surfaces previously occupied by the withdrawn members. If cored openings are to appear in the sidewalls of some of the compartments, the appropriate locking members 61 are, of course, held extended until the mold is about to be opened. It will be noted that in the core array, one of the outer cores (core 47 in FIG. 2) need not be provided with internal locking members 61 since it is held in transverse compression by members 61 of the next adjacent core 46 and the adjacent side member 52.

Referring to FIGS. 9–12, a modified form of the internal locking members and of the actuating means is disclosed. The primary distinction in the structure of FIGS. 9–12 is the use of dual coaxial internal locking members in the cores and a modified rotary actuating means in the longitudinal bores. Parts generally the same as those previously described are given the same reference numerals as in FIGS. 2–8. In FIGS. 9–12 a portion of three adjacent cores 71, 72 and 73 is shown. Cores 71 and 73 have no longitudinal or transverse bores and house no internal locking members. However, the second core in the array (and every other core following in the array) has a longitudinal bore 74 and a transverse bore 76 which intersects bore 74 and except for the final core extends completely through the core. On opposite sides of bore 74, the transverse bore carries side locking members 77, which are counterparts of locking members 61 of FIGS. 2–8. The formation of the interior ends of members 77 can best be seen in FIGS. 11 and 12. The ends are enlarged and urged into engagement with each other by a resilient means such as cup springs 78 (FIG. 12) placing locking members 61 in retracted position. The members 61 are shown in extended position in FIGS. 9 and 11 and in this position springs 78 are compressed into a substantially linear configuration.

Figure 11:
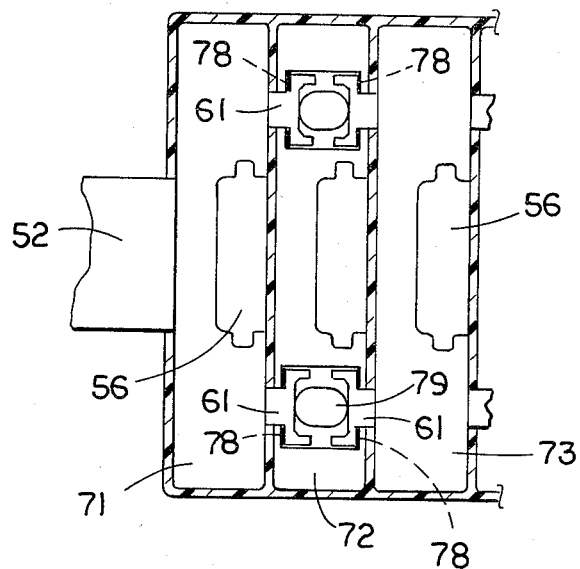
FIG. 11 is a top plan view (with the bottom wall of the molded case removed for clarity) of a portion of the core array of FIG. 9 showing the dual locking pins and the actuating means in extended position.
Figure 12:
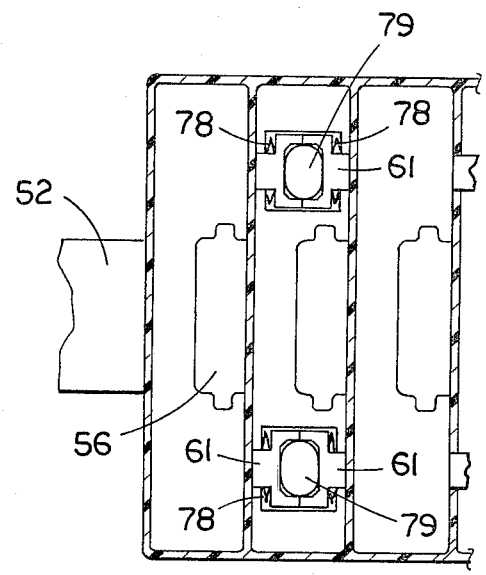
FIG. 12 is a view similar to FIG. 11 but showing the actuating means and the dual pins in retracted position.

The enlarged inner ends of adjacent members 61 are counterbored to jointly receive the head 79 of a cam having a prolate disc configuration and forming part of the actuating means, as may best be seen in FIGS. 11 and 12. As will be evident the members 61 are positioned either in extended position (FIG. 11) or retracted position (FIG. 12) depending upon the rotational position of cam head 79. In extended position members 61 engage and apply transverse, compressive stress on the adjacent cores; in retracted position they are substantially aligned, at their outer ends, with the sidewall of core 72.

The means for angularly moving the cams 79 takes the form of the drive rods 81a which are movable within the bores 74. The driving mechanism for the rods 81a is shown in FIG. 10 and consists of a pinion gear 82a at the lower end of each of the rods which meshes with a rectilinearly movable rack 88. The racks may be moved to angularly move the meshed pinions at the proper time in the molding sequence by means of an actuator 53a similar to the actuator 53 (FIG. 3), previously described, for moving side members 52.

Since alternate ones of the cores each carry transverse bores housing dual internal locking members 61, the remaining alternate cores are locked in transverse compressive stress by the dual members 61 of its adjacent counterpart in the core array, the outermost cores at the ends of the array being, of course, also engaged and braced by side members 52. The sequence of operation of the locking members in the molding cycle is the same as that described with reference to FIGS. 2–8.

Figure 14:
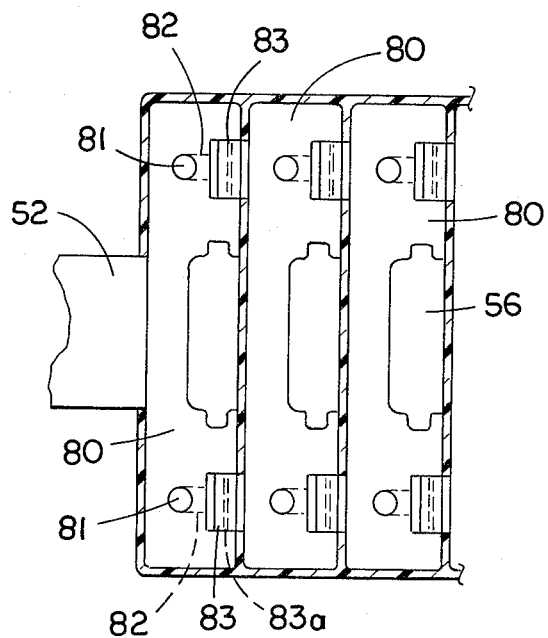
FIG. 14 is a sectional view of the apparatus shown in FIG. 13 taken generally along the line 14—14 of FIG. 13.
Figure 15:
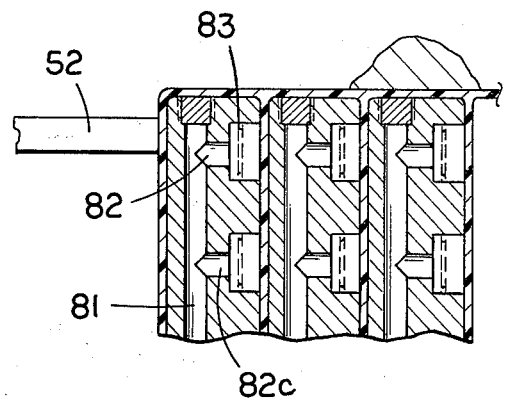
FIG. 15 is a view similar to FIG. 13 but showing the locking members in retracted position.
Figure 16:
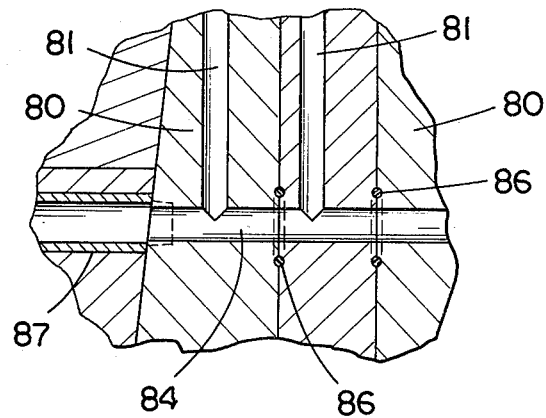
FIG. 16 is a fragmentary, side sectional view of the structure at the base of the cores shown in FIGS. 13–15 illustrating the hydraulic fluid connection to the longitudinal bore in each core.

Referring to FIGS. 14–16, a modified form of the invention, in which the internal locking members are actuated hydraulically, will be described. Parts substantially identical with those described with reference to FIGS. 2–8 will be identified by the same reference numerals as there used.

Figure 13:
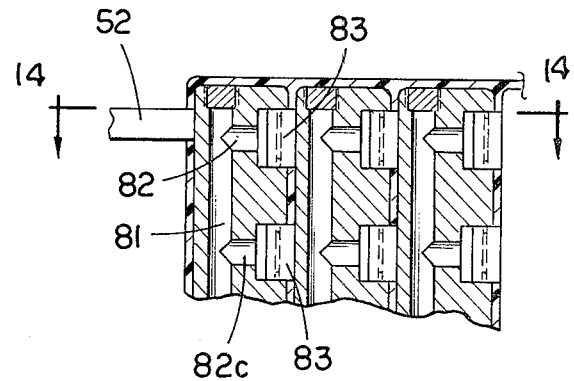
FIG. 13 is a fragmentary, side sectional view illustrating a further modified form of the invention.

As may best be seen in FIGS. 13 and 14, each of the cores 80 in the array except the final core has a pair of longitudinal bores 81 intersecting corresponding transverse bores 82. Each of the bores 82 is enlarged at its outer end and receives an internal locking member 83 which is slidable within its transverse bore and is sealed therein by any suitable means such as O-ring 83a. As may best be seen in FIGS. 13 and 15, an additional pair of transverse bores 82c, each carrying a locking member 83, communicates with the adjacent longitudinal bore 81.

As may best be seen in FIG. 16 the longitudinal bores 81 communicate, at the base of the cores, with a header bore 84 which extends through the core array, the junction between cores being sealed by O-rings 86. Hydraulic fluid, at a controlled pressure, is fed to the system through passages 87 extending to the exterior of the apparatus. Under hydraulic pressure the locking members 83 are moved to their extended position (FIG. 13 and 14) at the start of the molding cycle and in this position they exert transverse compressive stress on the side walls of the adjacent cores. The side members 52, as in previously described embodiments, exert compressive force on the end cores in the array. At the proper time in the molding cycle, by applying negative hydraulic pressure in line 87, the internal locking members 83 are caused to retreat to their retracted position (FIG. 15) in which their end faces are substantially flush with the adjacent side faces of the respective cores.

The primary advantage achieved by structure embodying the present invention is the abililty to lock the cores in position, under transverse compressive stress, without utilizing locking elements actuated from outside the cores which inherently leave protrusions on the inner face of the base wall of the container being molded. Increased battery and volume capacity is thus possible for the relatively flat, smooth-base battery case thereby produced. It will be understood that should it be desired that cored openings appear in the case compartment side walls, for accommodating inter-connection of the battery plates for example, the locking elements could be placed at any location on the sides of the cores and at these locations could remain in place in their extended positions until the mold is ready to be opened and the case is to be removed from the mold.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a mold assembly particularly adapted for the injection molding of thin-walled multi-partitioned containers requiring a relatively lengthy cantilever-mounted array of cores extending into the cavity member and having means adjacent the free ends of said cores for injection of plastic material into the space between the cavity member and the cores, wherein the improvement comprises internal core locking members reciprocally moveable in transverse bores formed in certain of the cores intermediate their ends, said members being moveable within their bores from a retracted position substantially flush with the side faces of their respective cores to an extended position in locking engagement with the side faces of the next adjacent cores, a longitudinal bore in the cores intersecting the corresponding transverse bore therein and actuating means within said longitudinal bore cooperating with said locking members for moving them between their retracted and extended positions to place the cores in transverse compression at predetermined times during the injection molding cycle.

2. A mold assembly as claimed in claim 1 in which said actuating means for each core takes the form of a pin reciprocable within said longitudinal bore, said pin and the adjacent end of said locking member having a cooperating configuration which converts motion of said pin within its longitudinal bore into motion of the locking member in its transverse bore.

3. A mold assembly as claimed in claim 2 in which the cooperating configuration of said pin and locking member comprise a head on the end of said locking member and an inclined slot in said pin receiving said head.

4. A mold assembly as claimed in claim 1 in which the cores are provided with two of said longitudinal bores positioned on opposite sides of the central longitudinal axis of the core and each intersecting a transverse bore.

5. A mold assembly as claimed in claim 1 in which said transverse bore in each of the cores is adjacent the free end thereof.

6. A mold assembly as claimed in claim 1 in which said actuating means takes the form of a fluid under pressure and said locking members take the form of pistons slidably disposed within their respective transverse bores and exposed to the fluid pressure in the longitudinal bores, whereby movement of said locking members between their extended and retracted positions is accomplished by varying the static pressure of the fluid in the longitudinal bores.

7. A mold assembly as claimed in claim 1 in which the actuating means for the cores takes the form of a pin rotatable within the longitudinal bore of the core, a camming element carried by the pin adapted to engage the adjacent locking member and means to rotate said pin to thereby move the locking member between its retracted and extended positions.

8. A mold assembly as claimed in claim 1 in which the transverse bore in at least one of said cores extends completely through the core, the bore sections on opposite sides of said longitudinal bore each carrying separate locking members which are simultaneously moved between their retracted and extended positions by said actuating means.

* * * * *